US010584509B1

(12) United States Patent
Zagorski

(10) Patent No.: US 10,584,509 B1
(45) Date of Patent: Mar. 10, 2020

(54) CONCRETE SAFEROOM AND METHOD OF MANUFACTURE

(71) Applicant: Zagorski Forms Specialists, Inc., Blanchard, OK (US)

(72) Inventor: Andrew Zagorski, Del City, OK (US)

(*) Notice: Subject to any disclaimer, the term of this patent is extended or adjusted under 35 U.S.C. 154(b) by 514 days.

(21) Appl. No.: 15/141,790

(22) Filed: Apr. 28, 2016

Related U.S. Application Data

(60) Continuation of application No. 13/317,632, filed on Oct. 24, 2011, now abandoned, which is a division of application No. 10/844,541, filed on May 13, 2004, now abandoned, which is a continuation-in-part of application No. 10/236,995, filed on Sep. 6, 2002, now abandoned.

(60) Provisional application No. 60/317,137, filed on Sep. 6, 2001.

(51) Int. Cl.
| | |
|---|---|
| *E04B 1/16* | (2006.01) |
| *E04G 11/08* | (2006.01) |
| *E04H 9/14* | (2006.01) |
| *E04G 11/02* | (2006.01) |

(52) U.S. Cl.
CPC .............. *E04H 9/14* (2013.01); *E04B 1/162* (2013.01); *E04G 11/02* (2013.01); *E04G 11/082* (2013.01)

(58) Field of Classification Search
CPC ........ E04G 11/02; E04G 11/082; E04B 1/162
See application file for complete search history.

(56) References Cited

U.S. PATENT DOCUMENTS

| | | | |
|---|---|---|---|
| 1,332,617 | A | 3/1920 | Dodge |
| 1,400,104 | A | 12/1921 | Thorig |
| 1,881,014 | A | 10/1932 | Ayers |
| 2,107,523 | A | 2/1938 | Coe |
| 2,499,478 | A | 3/1950 | Feser |
| 2,586,792 | A | 2/1952 | Davidson |
| 2,616,283 | A | 11/1952 | Branstrator |
| 2,836,863 | A | 6/1958 | Denker |
| 3,058,174 | A | 10/1962 | Sterling |
| 3,220,079 | A | 11/1965 | Aggson |
| 3,318,048 | A | 5/1967 | Odendhal |
| 3,348,337 | A | 10/1967 | Grasso |
| 3,426,480 | A | 2/1969 | Dzamba |
| 3,455,074 | A | 7/1969 | Rice |

(Continued)

FOREIGN PATENT DOCUMENTS

| | | |
|---|---|---|
| EP | 0431574 A2 | 6/1991 |
| GB | 2317914 A | 4/1998 |

*Primary Examiner* — Michael Safavi
(74) *Attorney, Agent, or Firm* — Michael S. Young IP Law LLC; Michael S. Young

(57) ABSTRACT

A saferoom has a concrete floor, plurality of concrete walls, and concrete roof/ceiling connected without seams or joints. Pouring the concrete floor, the plurality of concrete walls, and the concrete roof/ceiling may be part of an integrated pour molded by forms. The method may further include vibrating at least one of the concrete floor, plurality of concrete walls, or concrete roof/ceiling to control the rate of change in viscosity and structural strength of the concrete. The integrated pour may further include pouring a footing. The forms may be reusable. Some of the forms may be angled and chamfered. The integrated pour may be a single pour. The method may further include attaching a sliding door. The method may include placing steel rebar reinforcing prior to starting the integrated pour.

18 Claims, 9 Drawing Sheets

(56) References Cited

U.S. PATENT DOCUMENTS

| | | | |
|---|---|---|---|
| 3,480,989 | A | 12/1969 | Edeus |
| 3,597,513 | A | 8/1971 | Ocampo |
| 3,643,390 | A | 2/1972 | Shelley |
| 3,669,401 | A | 6/1972 | Nevarez |
| 3,696,177 | A | 10/1972 | Holland |
| 3,714,304 | A | 1/1973 | Carner |
| 3,742,102 | A | 6/1973 | Stickler, Jr. |
| 3,793,428 | A | 2/1974 | Gordon |
| 3,818,660 | A | 6/1974 | Dillon |
| 3,847,341 | A | 11/1974 | Stickler, Jr. |
| 3,847,521 | A | 11/1974 | Stickler, Jr. |
| 3,853,452 | A | 12/1974 | Delmonte |
| 3,854,263 | A | 12/1974 | Eckel |
| 3,874,134 | A | 4/1975 | Feldman et al. |
| 3,908,321 | A | 9/1975 | Cox et al. |
| 3,932,082 | A | 1/1976 | Beaman |
| 3,934,808 | A | 1/1976 | Aizawa |
| 3,973,365 | A | 8/1976 | Boot et al. |
| 3,976,741 | A | 8/1976 | Lowe et al. |
| 3,979,865 | A | 9/1976 | Boot et al. |
| D242,924 | S | 1/1977 | McKnight |
| 4,033,547 | A | 7/1977 | Heinzle |
| 4,088,296 | A | 5/1978 | Armas |
| 4,118,905 | A | 10/1978 | Shelley |
| 4,126,972 | A | 11/1978 | Silen |
| 4,210,306 | A | 7/1980 | Schimmel |
| 4,272,050 | A | 6/1981 | del Valle |
| 4,438,594 | A | 3/1984 | Bunzl |
| 4,447,035 | A | 5/1984 | Ivey et al. |
| 4,465,257 | A | 8/1984 | Schimmel |
| 4,490,864 | A | 1/1985 | Wicker, Jr. |
| 4,495,131 | A | 1/1985 | Del Valle |
| 4,539,780 | A | 9/1985 | Rice |
| 4,561,210 | A | 12/1985 | Kvas et al. |
| 4,570,896 | A | 2/1986 | Strickland et al. |
| 4,614,326 | A | 9/1986 | Strickland et al. |
| 4,644,709 | A | 2/1987 | Baumann |
| 4,667,923 | A | 5/1987 | Lee |
| 4,679,762 | A | 7/1987 | Lee |
| 4,799,982 | A | 1/1989 | Vicino |
| 4,846,438 | A | 7/1989 | Lee |
| 4,955,166 | A | 9/1990 | Qualline et al. |
| 5,182,884 | A | 2/1993 | Tarics |
| 5,210,985 | A * | 5/1993 | Hsu ............... A62B 13/00 109/1 R |
| 5,225,264 | A | 7/1993 | Kato et al. |
| 5,233,808 | A | 8/1993 | Salmenmaki et al. |
| 5,376,315 | A * | 12/1994 | Fricke ............... B28B 7/10 264/31 |
| 5,438,808 | A | 8/1995 | Costello |
| 5,481,837 | A | 1/1996 | Minks, Jr. |
| 5,522,264 | A | 6/1996 | Smith et al. |
| 5,560,150 | A | 10/1996 | Pearson |
| 5,565,263 | A | 10/1996 | Ohsumi et al. |
| 5,755,982 | A | 5/1998 | Strickland et al. |
| 5,788,874 | A | 8/1998 | Tucker, Jr. |
| 5,813,174 | A | 9/1998 | Waller |
| 5,829,208 | A | 11/1998 | Townley |
| 5,887,405 | A | 3/1999 | Carranza-Aubry |
| 5,893,241 | A | 4/1999 | Schroeder |
| 5,953,866 | A | 9/1999 | Poole |
| 5,997,792 | A | 12/1999 | Gordon |
| 6,029,419 | A | 2/2000 | Kimura |
| 6,085,475 | A | 7/2000 | Parks et al. |
| 6,151,841 | A | 11/2000 | Green |
| 6,161,345 | A * | 12/2000 | Hope ............... E04H 9/06 52/169.6 |
| 6,334,278 | B1 * | 1/2002 | Arnold ............... E04H 9/06 52/79.1 |
| 6,343,443 | B1 | 2/2002 | Tylicki, Jr. |
| 6,349,873 | B1 | 2/2002 | Slater |
| 6,374,553 | B1 | 4/2002 | Johnson |
| 6,393,776 | B1 | 5/2002 | Waller et al. |
| 6,438,906 | B1 * | 8/2002 | Komarowski ............ E04H 9/14 52/169.1 |
| 6,470,630 | B1 | 10/2002 | Miyamoto |
| 6,510,659 | B2 | 1/2003 | Boyer et al. |
| 6,539,674 | B2 | 4/2003 | Arnold |
| 6,938,381 | B1 * | 9/2005 | Villa ............... E04B 1/3211 52/79.1 |

* cited by examiner

900

1000

CONCRETE SAFEROOM AND METHOD OF MANUFACTURE

RELATED APPLICATIONS

The present application is a continuation of co-pending U.S. patent application Ser. No. 13/317,632 filed Oct. 24, 2011 that is a division of U.S. patent application Ser. No. 10/844,541 filed May 13, 2004 that is a continuation-in-part of U.S. patent Ser. No. 10/236,995 filed Sep. 6, 2002 that claims priority to U.S. Pat. App. No. 60/317,137 filed Sep. 6, 2001, all of which are hereby incorporated by reference in their entirety. U.S. patent application Ser. No. 10/844,541 was when U.S. patent application Ser. No. 13/317,632 was filed. U.S. patent application Ser. No. 10/236,995 was when U.S. patent application Ser. No. 10/844,541 was filed. U.S. Pat. App. No. 60/317,137 was when U.S. patent application Ser. No. 10/236,995 was filed.

FIELD OF THE INVENTION

The present invention relates generally to concrete saferooms and their manufacture, and more particularly, to concrete saferooms having good structural integrity and their manufacture.

BACKGROUND

Storm shelters that protect people and property from exposure to violent weather phenomena, sometimes called saferooms, have been built using a number of construction methods and materials. Unfortunately, these saferooms suffer from a number of problems. For example, underground saferooms constructed with concrete, fiberglass, metal, or a combination of materials, have good structural integrity but are prone to flooding, gas infiltration from gas line breaks and may be buried by debris. Conversely, above ground saferooms constructed with concrete block, welded or bolted steel sheets or other materials are less prone to these problems but they lack the structural integrity of underground saferooms and may have their walls and/or roof deform or collapse during severe weather or the like. Additionally, the construction time and cost often make such above ground and underground saferooms prohibitively expensive. Accordingly, there is a strong need for inexpensive saferooms that have good structural integrity and are less prone to flooding, gas infiltration or being buried by debris.

SUMMARY OF THE INVENTION

An aspect of the present invention is to provide a concrete saferoom including a concrete floor, a plurality of concrete walls and a concrete ceiling. The concrete floor, the plurality of concrete walls and the concrete ceiling are connected without seams or joints. The concrete floor, the plurality of concrete walls and the concrete ceiling may further include steel rebar reinforcing. The plurality of concrete walls may have a plurality of ventilation ports. The concrete floor, the plurality of concrete walls and the concrete ceiling may be above ground. The concrete floor, the plurality of concrete walls and the concrete ceiling can meet the FEMA criteria for use as an above ground storm shelter. The concrete floor, the plurality of concrete walls and the concrete ceiling can have the structural integrity to: (a) withstand 250 mile per hour tornado force winds and wind driven projectiles without substantial damage or destructive deformation, can resist penetration of a wind propelled projectile traveling at 100 miles per hour, with the object bouncing off, causing no damage to the structure or injury to the occupants when a door secured in place; and (b) maintains structural integrity when an object weighing several tons falls on its roof. The concrete of the concrete floor, the plurality of concrete walls and the concrete ceiling may have a compressive strength in excess of 4500 psi at 28 days. The concrete floor, the plurality of concrete walls and the concrete ceiling may be cast in place on site and may be part of a new construction or part of a modification of an existing building. The saferoom may further include a concrete footing connected to the concrete floor where the concrete footing, the concrete floor, the plurality of concrete walls and the concrete ceiling are connected without seams or joints. A door supported on four sides by the concrete saferoom may also be included. The door may be a sliding door. The concrete floor, the plurality of concrete walls and the concrete ceiling may be monolithic and may optionally include a footing.

Another aspect of the invention is to provide a method of manufacturing a concrete saferoom including pouring a concrete floor, pouring a plurality of concrete walls and pouring a concrete ceiling. The pouring the concrete floor, the pouring the plurality of concrete walls and pouring the concrete ceiling may be part of an integrated pour. The method may further include vibrating at least one of the concrete floor, the plurality of concrete walls and the concrete ceiling. The vibrating may be used to control the rate of change in viscosity and structural strength of the concrete of at least one of the concrete floor, the plurality of concrete walls and the concrete ceiling. A timing of the integrated pour utilizes the continuous change in viscosity and structural strength of concrete as it cures to support a monolithic structure. The integrated pour may further include pouring a footing. The integrated pour may be molded by forms. The forms may be reusable. Some of the forms may be angled and chamfered. The integrated pour may be a single pour. The method may further include attaching a sliding door. The method may include placing steel rebar reinforcing prior to starting the integrated pour.

BRIEF DESCRIPTION OF THE DRAWINGS

The invention will be described in detail with reference to the following drawings in which like reference numerals refer to like elements wherein.

DETAILED DESCRIPTION

Figure 1:
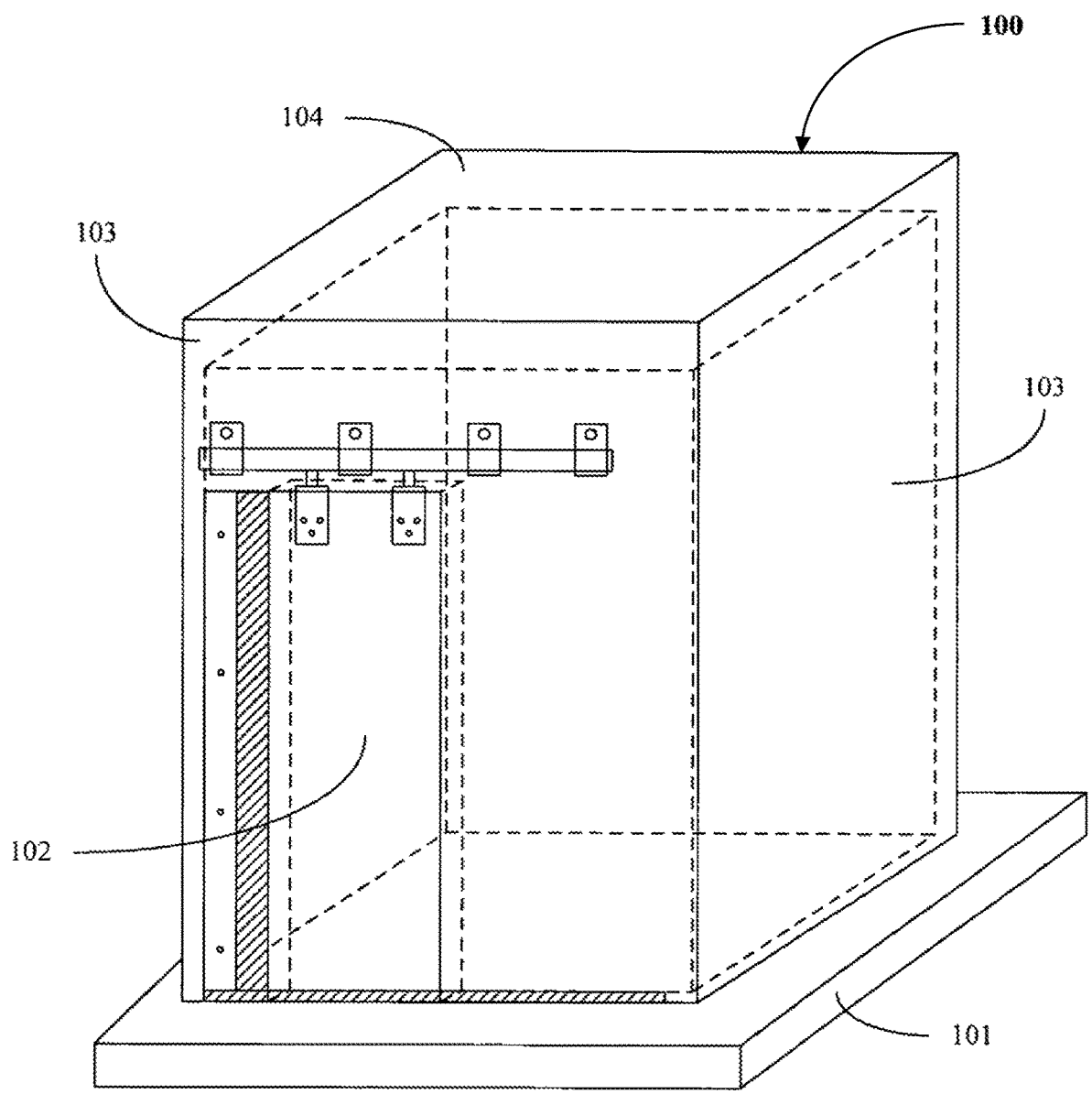
FIG. 1 illustrates an exemplary three dimensional perspective view of the exterior of a completed saferoom.

Concrete saferooms with good structural integrity may be formed monolithically in concrete. Such monolithic saferooms may be formed by a single concrete pour such that the resultant saferoom is seamless and jointless and may be steel reinforced. This enhances the structural integrity of such saferooms by eliminating joint failure or deformation so they can survive both tornado force winds and impacts from heavy objects. Such saferooms meet FEMA criteria and are inexpensive to build. Such saferooms, their construction and advantageous are discussed below.

The current FEMA criteria for viable, survivable saferooms have two parts. The first part of the FEMA criteria is that the saferoom should maintain its structural integrity when bombarded by projectiles driven by tornado force winds. The second part of the FEMA criteria is that the saferoom should be sufficiently cost effective to be incorporated into a modestly priced residential home or other type of building as new construction or as a retrofit of an existing home or other type of building. The monolithic concrete saferoom disclosed herein is believed to be the first above ground saferoom to meet the above FEMA criteria.

More specifically, a monolithic concrete saferoom may be formed in a single pouring of concrete so as to create a seamless/jointless structure. This monolithic saferoom may be cast in place and may include steel reinforcing. Following placement of the steel reinforcing, the mechanic(s) place, secure and brace interior and exterior plywood forms in a correct position to carry out the monolithic molding operation (no seams or joints) and to facilitate removal of the forms following the molding operation. The forms include an inner form and an outer form, and may be angled and chamfered and constructed to facilitate removal from the interior of the structure. The cost of materials and labor for fabrication for such a monolithic saferoom are reduced as compared to those of a conventional saferoom. This cost reduction makes the monolithic saferoom reasonably priced, thereby meeting the FEMA criteria.

In addition to being reasonably priced, such a monolithic concrete saferoom has sufficient structural integrity to not only meet, but exceed the FEMA criteria for use as an above ground storm shelter. For example, such a monolithic saferoom:

(a) has the structural integrity to withstand without damage or destructive deformation, 250 mile per hour tornado force winds as well as wind driven projectiles;

(b) the structure can resist penetration of a wind propelled projectile traveling at 100 miles per hour, with the object bouncing off, causing no damage to the structure or injury to the occupants when the door is secured in place;

(c) maintains its structural integrity when an object weighing several tons falls on its roof;

(d) may be fabricated from materials that are available at reasonable cost nationwide and within the budget of most families—e.g., the saferoom may be constructed from Portland cement, sand and water together with conventional additives sufficient to create a concrete having a viscosity and compressive strength in excess of 4500 psi at 28 days, and #4 steel reinforcing rods;

(e) be fabricated with prepared, reusable, plywood forms and a three man crew, working for three days which keeps the labor cost low; and (f) may be cast in place on site such that the monolithic saferoom may be constructed as part of new construction or as a modification of an existing residence or other building within or in proximity to the residence or other building without added cost.

For example, a saferoom may be constructed in place, above ground and include 4500 psi steel reinforced concrete for the footing (also known as a footer), floor, walls and roof/ceiling. The floor and footing may be a single structure. The steel reinforcing may be #4 (½") inch steel reinforcing rods or any other suitable reinforcing. The concrete, which is a universally accepted high quality, durable material of reasonable cost, may be made up of an aggregate or aggregates bound by a matrix composed of Portland cement, high alumina cements, synthetic resins or any other combination of cementious materials and suitable additives that may be structurally integrated. For example, Portland cement, sand and water together with conventional additives may be combined to produce a concrete having a compressive strength in excess of 4500 psi at twenty eight (28) days which is sufficient to produce a saferoom having a good structural integrity.

Construction with this method begins with preparation of the site by leveling the soil and digging a footing (e.g., 12" footing) or to the depth determined by the local frost line and/or soil conditions. The mechanics would then place and tie steel reinforcement rods for the footing, floor slab, walls and roof/ceiling—creating a mat/cage (e.g., a 6" by 8" mat/cage)—which constitutes the interior skeleton of the structure.

Then, an integrated pour of concrete would be done such that no seams/joints are formed in the resulting structure. For example, concrete is pumped continuously into the forms in sequence: footing (if there is a footing), floor slab, walls and finally the roof/ceiling. During the pour, the mechanic vibrates the concrete to prevent voids and for compaction. When the concrete has filled the footing, floor slab and has risen to its full height in the side walls between the internal and external panels, concrete is then applied over the top of the internal panels forming the ceiling/flat roof of the saferoom. The roof refers to the top of the structure and the ceiling is the undersurface of the roof.

The timing of the concrete pour utilizes the continuous change in viscosity and structural strength of concrete as it cures to support a monolithically formed structure. Vibration may be used to control the rate of change in viscosity and structural strength of the concrete. Thus, the structure may be cast monolithically without seams or cold joints. The concrete may be formed, for example, by a mixture of Portland cement, sand, water and conventional additives. The concrete may include steel or other reinforcement.

An exemplary finished saferoom may include four substantially vertical steel reinforced concrete walls at substantially right angles to each other. The floor may be joined to the walls and the walls may be joined to the ceiling, without seams or joints, forming a structurally stable load bearing saferoom. For example, a saferoom may be constructed as a rectangular structure having an exterior length of 78", an exterior width of 78", an exterior height of 92", an interior length of 62", an interior width of 62", an interior height of 62", a floor slab of 12" thickness, walls of 8" thicknesses and a ceiling/roof of 18" thickness. As another example, a saferoom may be constructed as a rectangular structure having an exterior length of 78", an exterior width of 78", an exterior height of 92", an interior length of 60", an interior width of 60", an interior height of 74", a footing of 12" thickness, a floor slab of 10", walls of 8" thicknesses and a ceiling/roof of 18" thickness. The thickness of the walls and roof are measured transversely in areas free from localized thickening. The saferoom entry is a 26" wide opening with a laminated plywood and steel sliding door used to seal the saferoom. Alternatively, the saferoom may be any seamless/jointless, load bearing steel reinforced concrete saferoom formed by monolithically pouring concrete and using forms may have any suitable shape and any suitable dimension. Preferably the forms are reusable.

The saferoom and its method of manufacture will now be discussed with reference to the following figures.

FIG. 1 illustrates an exemplary three dimensional perspective view 100 of the exterior of a completed saferoom. The saferoom includes a floor slab 101 (e.g., a 12" thick floor slab), a door aperture 102, a plurality of walls 103 (e.g., 8" thick walls) and a roof/ceiling 104 (e.g., a 18" thick roof/ceiling). As illustrated in FIG. 1, the door would be in an installed and closed position; and the floor slab is joined to four substantially vertical walls 103 at substantially right angles to each other connect to the roof/ceiling 104. Where the roof/ceiling meets the interior wall there is an interior angle of, e.g., forty-five degrees, creating chamfers longitudinally (e.g., 12" chamfers). Upon completion of the casting and stripping of exterior forms, lag bolts (e.g., 1½" lag bolts) and metal brackets are affixed to the exterior walls of the saferoom at the points where the ventilation tube openings exit the saferoom to prevent flying debris from entering the saferoom through the ventilation holes. The forms may be removed one day after pour and the door hardware attached. The exterior of the completed saferoom may be any suitable size (e.g., 78" cube) with the interior having a corresponding size (e.g., 62" cube). The door also may be any suitable size (e.g., 26" wide by 62" high or 26" wide by 72" long). Also shown are the bottom rail, the "Z" rail on the left side of the door opening and the brackets to hold the door to the top rail. The saferoom may or may not include a footing (not shown) (e.g., a 12" thick footing).

Figure 2:
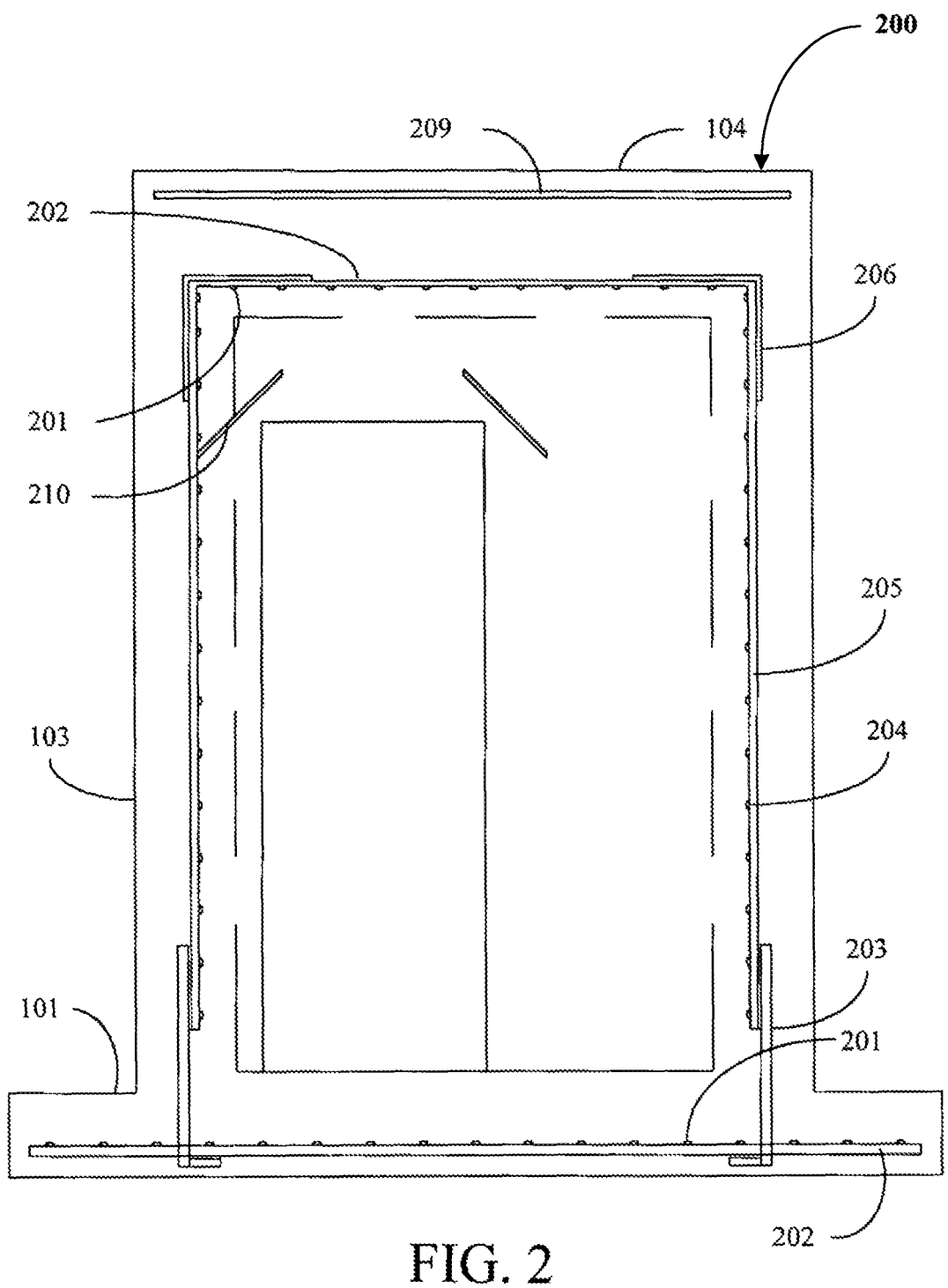
FIG. 2 illustrates an exemplary steel reinforcing rod layout for an exemplary skeletal structure.

FIG. 2 illustrates an exemplary steel reinforcing rod (sometimes called rebar) layout for an exemplary skeletal structure 200. The skeletal structure 200 includes a bottom cage—longitudinal mat 201 (e.g., #4 bar @ 8" lateral), a bottom cage—lateral mat 202 (e.g., #4 bar @ 6" longitudinal), a L bar 203 (e.g., #4 24"×24" L bar @ 8", each mat), a wall cage—horizontal mat 204 (e.g., #4 bar @ 6" horizontal, mat), a wall cage—vertical mat 205 (e.g., #4 bar @ 8" vertical, mat), a L bar for the roof/ceiling 206 (e.g., #4 24"×24" L bar @ 8", each mat), a roof cage—lateral mat 207 (e.g., #4 bar @ 8" lateral), a roof cage—longitudinal mat 208 (e.g., #4 bar @ 6" longitudinal), an extra metal bar—longitudinal 209 (e.g., #4 bar, longitudinal and lateral), and diagonal bars along top of the door opening 210 (e.g., #4 bar 12" each corner, longitudinal). This exemplary steel reinforcing rod or rebar layout may be formed from, for example, ½" #4 rebar being tied in mats/cages (e.g., 6" by 8" mats/cages) as a skeletal support for the entire structure, including the floor slab 101, the walls 103, and roof/ceiling 104.

After the steel reinforcing rods are placed and tied, interior and exterior plywood forms are placed and braced and ventilation holes (e.g., ¾" inch diameter holes) are drilled through the forms from the interior to the exterior of the structure. Any suitable placement and any suitable number of ventilation holes may be used. For example, the structure may include six ventilation holes in each side wall and four ventilation holes in the door wall, with each of the ventilation holes being located 6" and 24" above the elevation for the finished floor slab 101. Tubes, such as PVC tubes (e.g., ¾" diameter by eight inch 8" long PVC tubes) may be placed horizontally with in the drilled ventilation holes. These completed structures are sometimes called ventilation ports or air vents.

Figure 3:
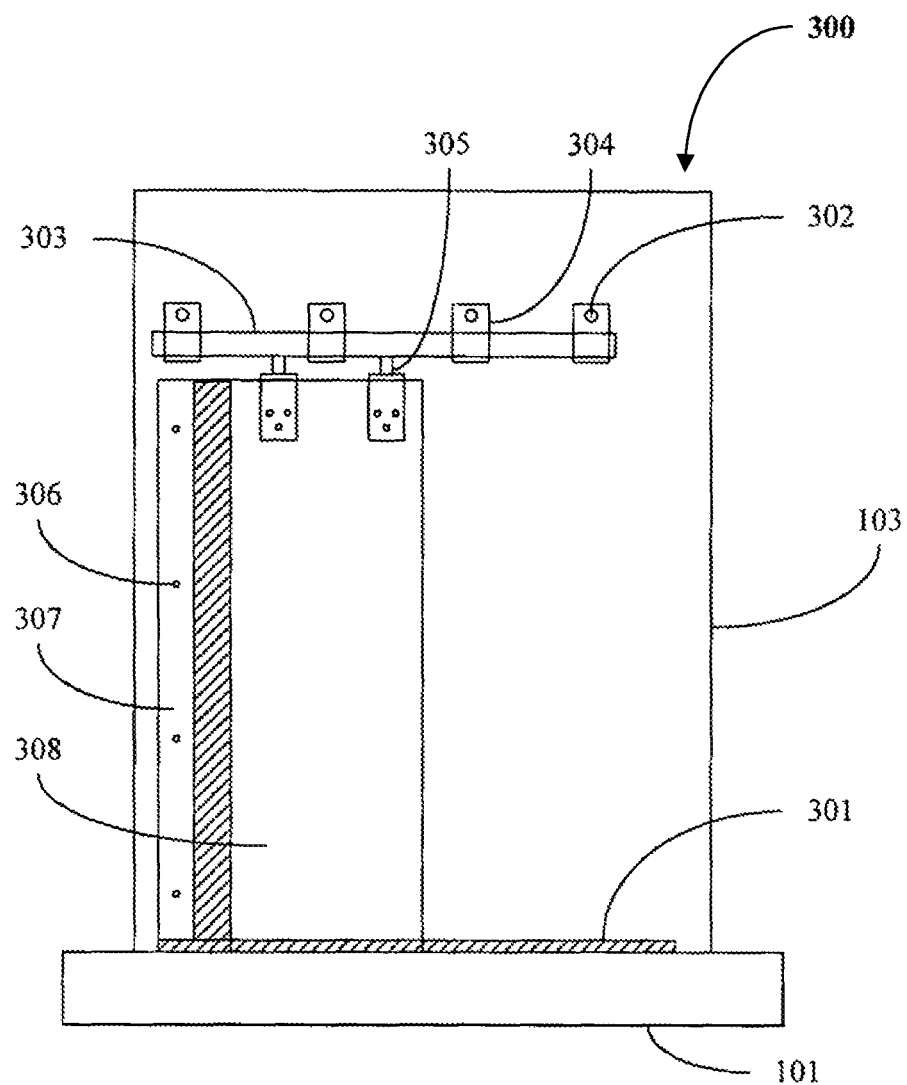
FIG. 3 illustrates an exemplary exterior view of the front of a completed saferoom with a door installed.
Figure 9:
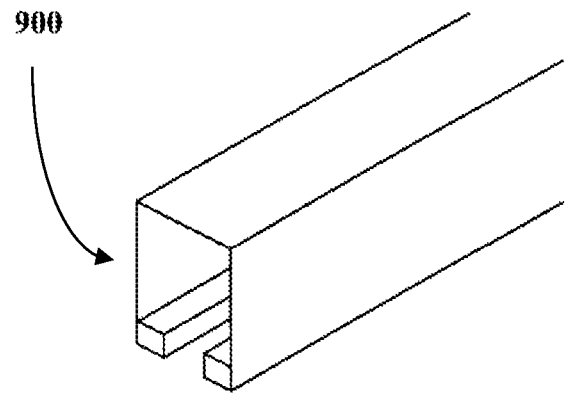
FIG. 9 illustrates an exemplary prior art steel box rail that is commercially available for use with the door.
Figure 10:
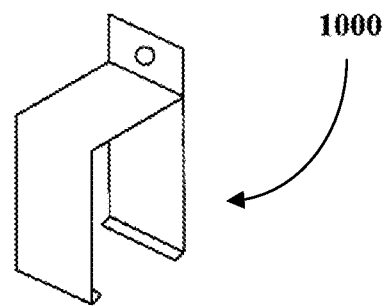
FIG. 10 illustrates an exemplary prior art steel bracket that is commercially available for use with the door.
Figure 11:
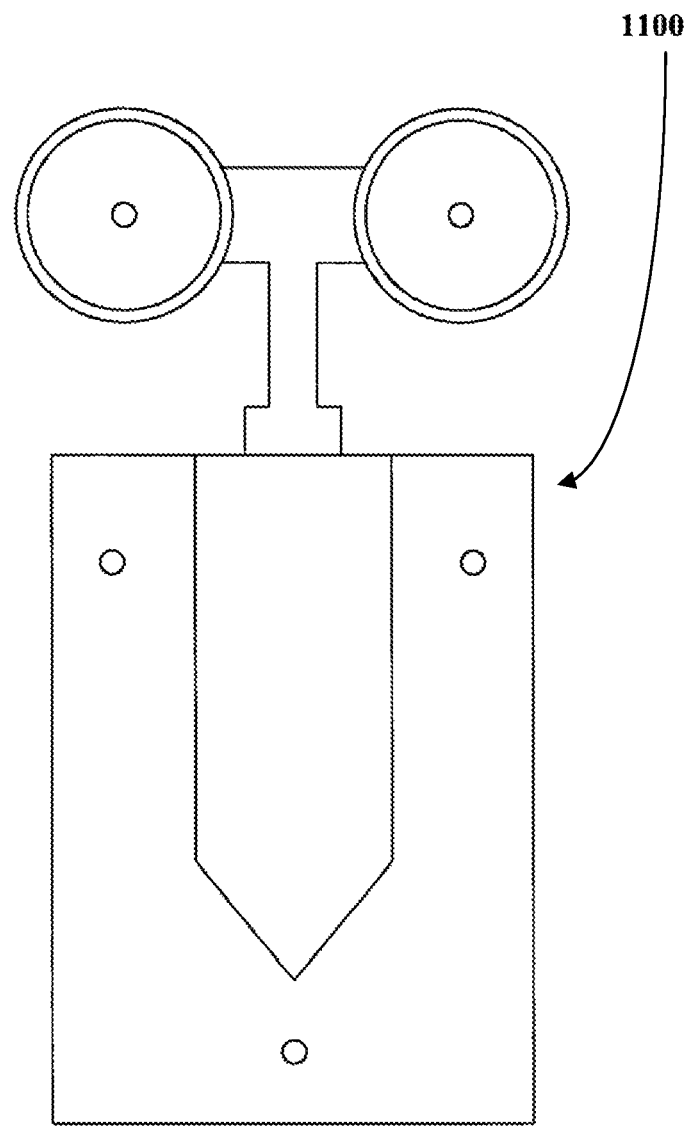
FIG. 11 illustrates an exemplary prior art roller assembly that is commercially available for use with the door.

FIG. 3 illustrates an exemplary exterior view 300 of the front of a completed saferoom with a door installed. This exemplary exterior view 300 illustrates a bottom angle iron 301 that provides a bottom guide for the door 308, a plurality of lag bolts 302 (e.g., four 1½" stainless steel lag bolts), a top rail 303 (e.g., a 60" steel box rail such as illustrated in FIG. 9) that provides a top guide for the door 308, brackets 304 (e.g., a steel bracket such as illustrated in FIG. 10) for securing the top rail 303, a roller bracket 305 (e.g., a roller assembly such as illustrated in FIG. 11), a plurality of thru bolts 306 (e.g., 9" long and ⅝" diameter thru bolts), a side rail 307 (e.g., ¼" Z rail), a wall 103, the door 308 and a floor slab 101. The side rail 307 overlaps (e.g., 1½" of overlap) the door 308 when the door 308 is in the closed position.

Two brackets 305 are attached to the top of the door 308. Each bracket 305 with a suitable number of bolts (e.g., 3 or 4) which go through the face of the door 308 to be fastened on the inside. At the center of each bracket 305 is an adjustable metal rod whose purpose is to level the door 308, to which are attached suitable a number of rollers (e.g., two 2" diameter roller) which allow the door 308 to slide back and forth on the top rail 303. The door 308 should be properly leveled (e.g., the bottom edge of the door being located 1¾" below the finished floor 101) and should remain securely within the flanges of the bottom rail 301 as the door 308 slides from right to left on the top rail 303 on its rollers.

Figure 4:
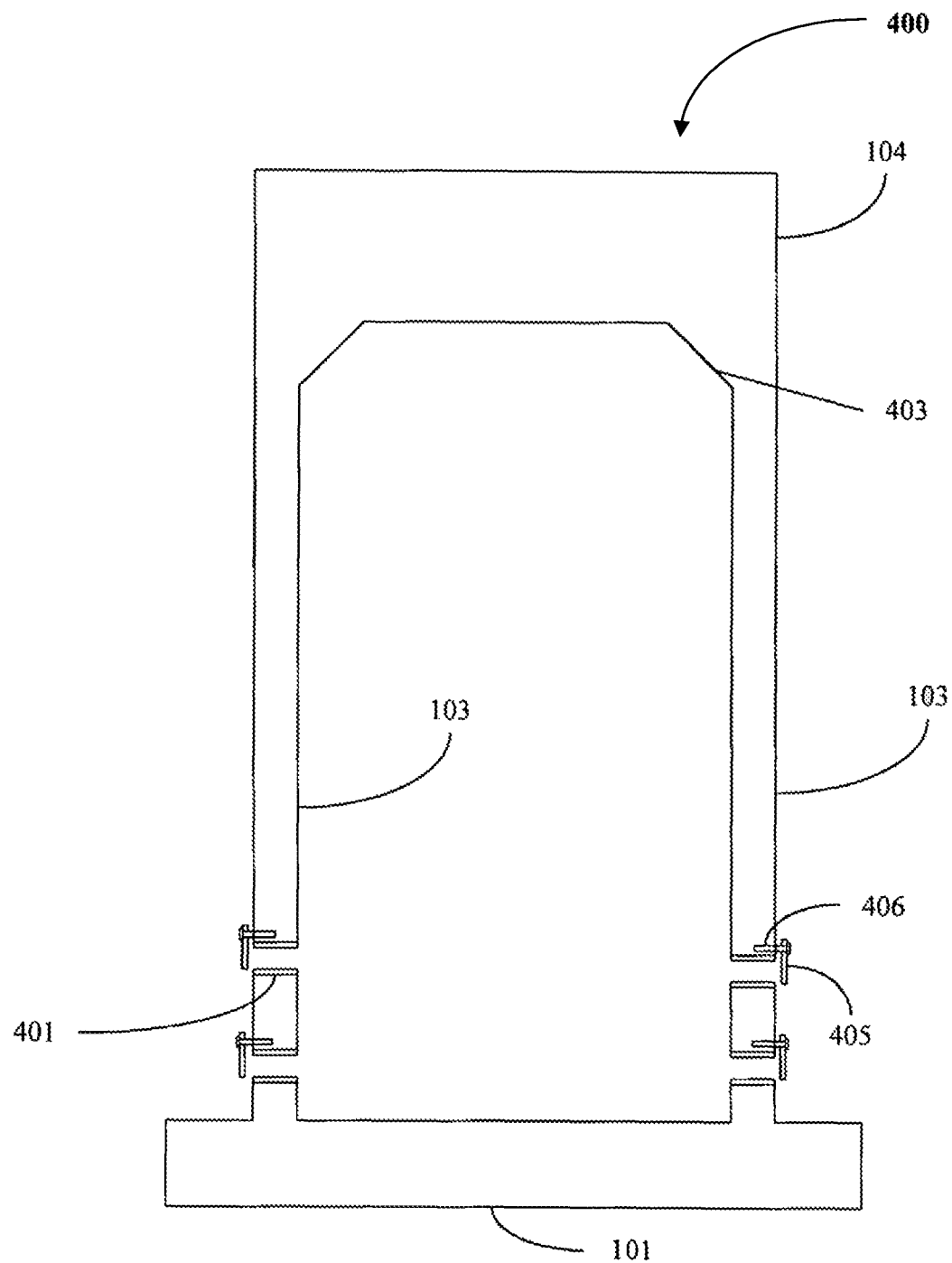
FIG. 4 illustrates an exemplary cross sectional view of the floor slab, walls, roof/ceiling and ventilation ports.
Figure 5:
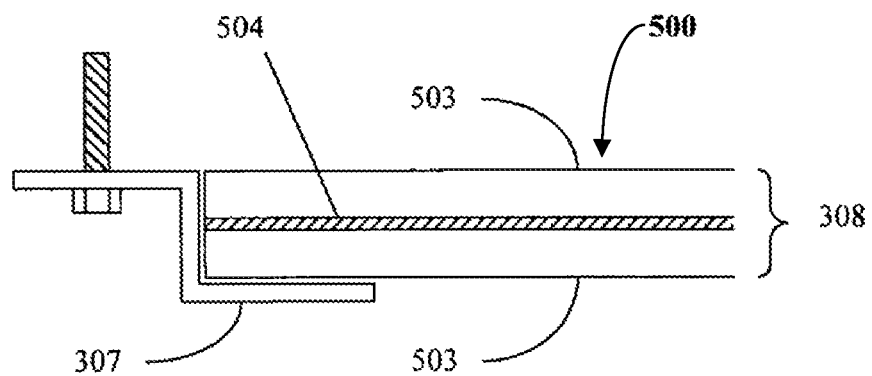
FIG. 5 illustrates an exemplary side view of the side rail and the door.

FIG. 4 illustrates an exemplary cross sectional view 400 of the floor slab 101, walls 103 and roof/ceiling 104, with interior and exterior dimensions and ventilation ports. This exemplary cross sectional view 400 includes the floor slab 101, a plurality of ventilation ports or air vents 401, a plurality of longitudinal chamfers 403 (e.g., 12"), roof/ceiling 104 (e.g., 18" thick), and the front wall 103 (e.g., 8" thick). Each of the ventilation ports or air vents 401 may be covered with a vent cap c (e.g., a ¾" galvanized vent cap or galvanized bracket) attached with a bolt 406 (e.g., a ⁵⁄₁₆" lag bolt). The ventilation ports or air vents 401 may be included in any suitable number, in any suitable location and made of any suitable material (e.g., six PVC vents in the side wall and four PVC vents in the front wall 103 located 6" and 24" above the floor slab 101).

FIGS. 5-8 illustrates exemplary perspective views of the door panel, bottom door rail and side bracket. The exemplary side view 500 of FIG. 5 includes the side rail 307 (e.g., 72" bracket or Z rail), a pair of outer sheets 503 (e.g., ¾" plywood sheets) and an inner sheet 504 (e.g., a 10 gauge steel sheet of ¼" thickness). The side rail 307 (e.g., 72" bracket or Z rail) may be bolted vertically into the face of the saferoom adjacent to the left side of the door aperture 102 held in place with a plurality of bolts 306 (e.g., four 9" carriage bolts) which go through the wall 103 (e.g., 8" wall), with a nut and washer affixed to each carriage bolt as it enters the interior of the building. When in a closed position, part (e.g., 1½") of the leading edge of the door will be behind the bracket.

Figure 6:
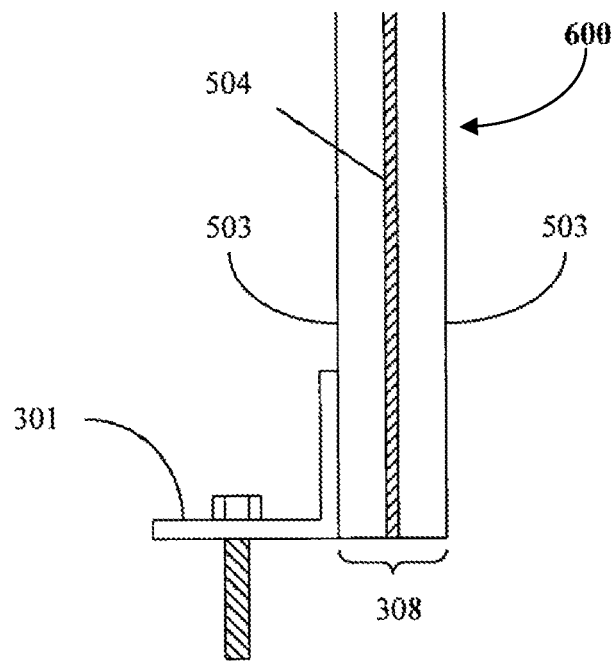
FIG. 6 illustrates an exemplary side view of the bottom rail and the door.
Figure 7:
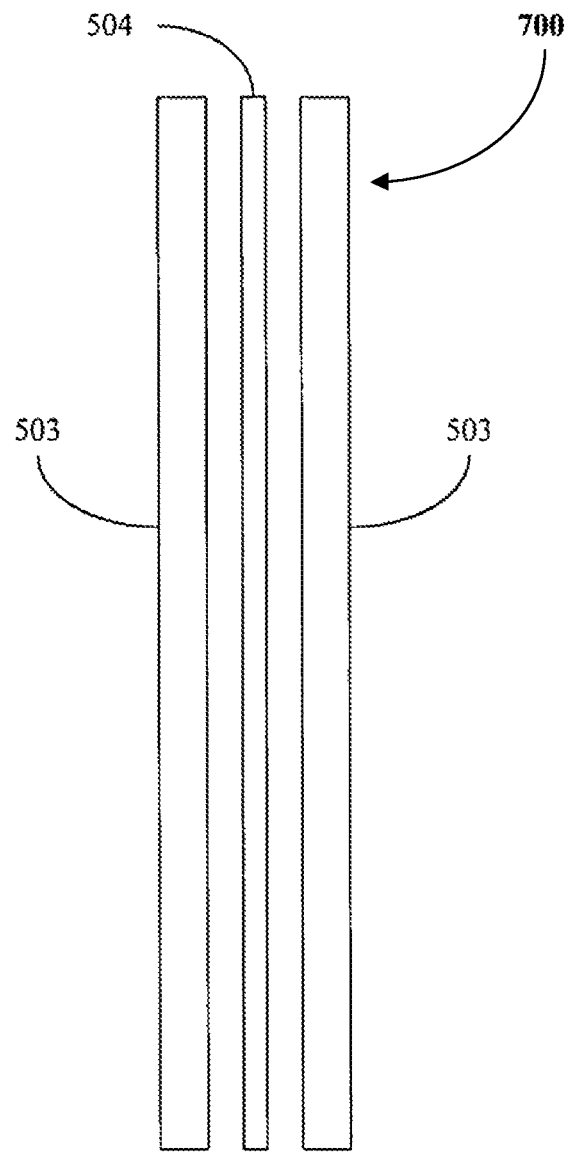
FIG. 7 illustrates an exemplary expanded side view of the door.

The exemplary side view 600 of FIG. 6 includes the bottom rail 301 (e.g., a 60" angle iron bracket), the pair of outer sheets 503 (e.g., ¾" plywood sheets) and the inner sheet 504 (e.g., a 10 gauge steel sheet of ¼" thickness).

The saferoom may include a sliding door 700. This sliding door 700 may be formed from a steel sheet 702 and a pair of laminated plywood sheets 704 as is illustrated in the expanded side view of FIG. 7. For example, a 32" wide by 72" high saferoom door may be a laminated construction such as a 10 gauge ¼" steel sheet sandwiched between two ¾" inch plywood sheets and may include a cam lock. These laminated layers may be held together with an array of through fasteners and/or adhesives such as glue.

Figure 8:
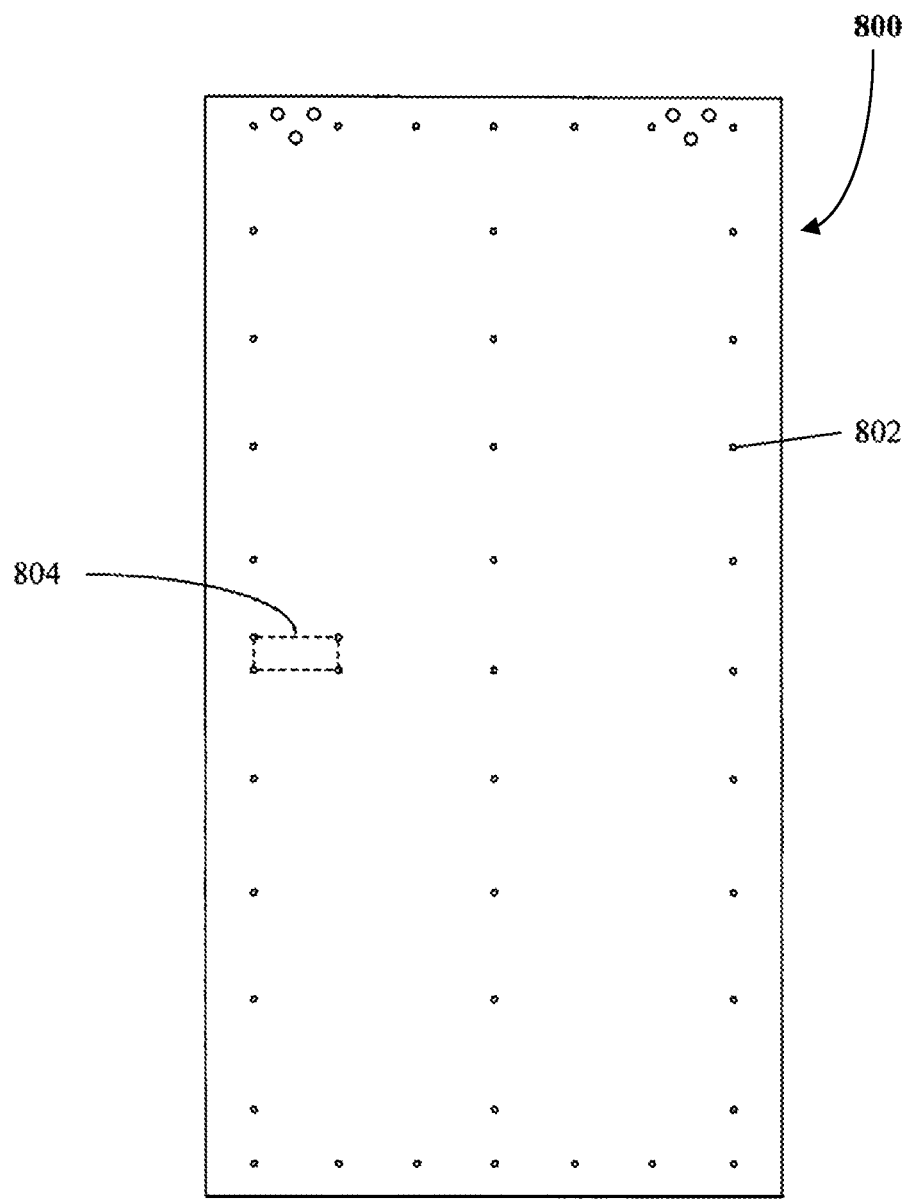
FIG. 8 illustrates an exemplary front view of the door drilled through with a plurality of holes and carriage bolted.

As is illustrated in the exemplary front view 800 in FIG. 8, the door 308 may be drilled through with a plurality of holes (e.g., forty ⅜" diameter holes placed every 8") and carriage bolted with bolts 802 (e.g., with ⅜" galvanized steel bolts, nuts and washers). The right side of the door facing the interior, approximately 36" from the bottom, is routed to create an opening 804 which is 8" long by ¾" deep by 2" wide. The door is drilled through to accept the bolts, which will create the locking mechanism to accept the receiving arm of the cam lock mechanism, which may be removed from the outside. The cam lock may be affixed to the side (e.g., right or left side) of the door aperture by lag bolts (e.g., four stainless steel lag bolts). To engage the cam lock, the door is closed and pulled firmly against the face of the structure.

Two rails upon which the door will slide may be affixed to the top and bottom of the door aperture by lag bolts (e.g., four stainless steel 1½" lag bolts) drilled into the concrete face of the saferoom. The saferoom door may be made resistive to being pushed into the structure by supporting the saferoom door on four sides and by having the walls be monolithically poured walls.

FIG. 9 illustrates an exemplary prior art steel box rail 900 that is commercially available for use with the door.

FIG. 10 illustrates an exemplary prior art steel bracket 1000 that is commercially available for use with the door.

FIG. 11 illustrates an exemplary prior art roller assembly 1100 that is commercially available for use with the door.

As discussed above, a saferoom may be a monolithically cast in place saferoom wherein the footing, floor, walls and roof are poured monolithically to form an integral steel reinforced concrete structure with four walls, that is stable and load bearing, with adjoining walls being at substantially right angles to each other. Such a saferoom may be formed of 4500 psi or greater psi concrete and the reinforcing may be ½" #4 steel bars, tied in place to form a 6" by 8" cage forming an interior skeletal structure. Such a monolithically poured saferoom may be cast in place, is structurally stable, may be load bearing, and may be constructed as a standalone structure (not part of another building). An exemplary saferoom may include four substantially planar, vertical, steel reinforced, concrete walls having an average thickness of 8", at substantially right angles to each other and having an 18" roof/ceiling, with the floor slab joined to the footing and walls, forming a structurally stable load bearing saferoom, which when standing in an unsupported condition, at least 28 days after casting, will withstand a load of 4500 psi without exhibiting any destructive deformation. Such a monolithically poured saferoom may be cast in place or prefabricated off site. A monolithically poured saferoom assembled from monolithically fabricated modules.

The above discussed monolithically cast and poured steel reinforced concrete saferoom, utilizing my reusable forms and a laminated door, as described above, provides excellent protection from severe weather such as tornados and other dangers. Such a saferoom provides a person a convenient safe place to go when they are notified of an impending storm or the like. For example, a home owner notified of an impending storm or the like could enter their saferoom along with their family, pets and valuable possessions by sliding the saferoom door on its track across the opening and locking the door in place with a cam lock that secures the door to the wall of the saferoom. When the storm is over, the cam lock may be released and the door is slid open to allow egress from the saferoom. The door may be easily removed from the outside if the occupants of a saferoom are unable to open the door from the inside.

The saferooms disclosed herein may be included in a wide variety of contexts and may be formed in a variety of shapes, sizes and configurations. For example, saferooms may be single or multiple room structures and may be used for private residences purposes or for larger buildings such as community shelters, 911 centers, and co-location buildings for telecommunications facilities. In addition to being used for the protection of people, the saferooms disclosed herein may also be used for other structures including, but not limited to, the protection of equipment, personal property and hazardous materials storage.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

I claim:

1. A saferoom comprising:
   a flat ceiling;
   a plurality of walls substantially vertical with respect to the flat ceiling, the plurality of walls substantially at right angles to each other;
   a floor slab substantially horizontal with respect to the plurality of walls, wherein the flat ceiling, the plurality of walls, and the floor slab are a monolithic structure of concrete without seams and without joints between the flat ceiling, the plurality of walls, and the floor slab,
   a continuous skeletal structure of steel reinforcing rod through the flat ceiling, the plurality of walls, and the floor slab;
   an exterior surface of the flat ceiling, the plurality of walls, and the floor slab; and
   a portion of the continuous skeletal structure of steel in the floor slab extends laterally beyond the exterior surface.

2. The saferoom of claim 1, wherein the flat ceiling, the plurality of walls, and the floor slab has structural integrity to withstand 250 miles per hour tornado force winds and wind driven projectiles without substantial damage or destructive deformation.

3. The saferoom of claim 1, further comprising:
   an interior of the flat ceiling, the plurality of walls, and the floor slab; and
   a door aperture that is the only egress from the interior for people.

4. The saferoom of claim 3, further comprising:
   a sliding door configured to slide from a first position wherein the door aperture is open for egress to a second position wherein the door aperture is closed for egress.

5. The saferoom of claim 1, further comprising:
   an interior of the flat ceiling, the plurality of walls, and the floor slab; and
   a plurality of ventilation ports in each of the plurality of walls, wherein the ventilation ports are configured to provide ventilation of the interior during severe weather.

6. The saferoom of claim 5, further comprising:
   a PVC tube through each of the plurality of ventilation ports.

7. A saferoom comprising:
   a flat roof;

a plurality of walls substantially vertical with respect to the flat roof, the plurality of walls substantially at right angles to each other;

a floor slab substantially horizontal with respect to the plurality of walls, wherein the flat roof, the plurality of walls, and the floor slab are a monolithic structure of concrete without seams and without joints between the flat roof, the plurality of walls, and the floor slab;

a continuous skeletal structure of steel reinforcing rod through the flat roof, the plurality of walls, and the floor slab;

an interior of the monolithic structure of concrete;

a door aperture that is the only egress from the interior configured to protect people from severe weather; and a pair of diagonal bars of steel atop the door aperture.

8. The saferoom of claim 7, further comprising:

an exterior surface of the monolithic structure of concrete; and a portion of the continuous skeletal structure of steel in the floor slab extends laterally beyond the exterior surface.

9. The saferoom of claim 7, wherein the monolithic structure of concrete is configured to have structural integrity to withstand, without substantial damage or destructive deformation, 250 miles per hour tornado force winds and wind driven projectiles.

10. The saferoom of claim 7, further comprising:

an extra metal bar that is disposed above the continuous skeletal structure of steel reinforcing rod through the monolithic structure of concrete in relation to the floor slab.

11. The saferoom of claim 7, further comprising:

an interior of the monolithic structure of concrete;

a plurality of ventilation ports in each of the plurality of walls, wherein the ventilation ports are configured to provide ventilation of the interior during severe weather; and a PVC tube through each of the plurality of ventilation ports.

12. A saferoom comprising:

a flat ceiling;

a plurality of walls substantially vertical with respect to the flat ceiling, the plurality of walls substantially at right angles to each other;

a floor slab substantially horizontal with respect to the plurality of walls, wherein the flat ceiling, the plurality of walls, and the floor slab are a monolithic structure of concrete without seams and without joints between the flat ceiling, the plurality of walls, and the floor slab;

a continuous skeletal structure of steel reinforcing rod through the flat ceiling, the plurality of walls, and the floor slab;

an interior of the monolithic structure of concrete;

a plurality of ventilation ports in each of the plurality of walls, wherein the ventilation ports are configured to provide ventilation of the interior during severe weather without compromising structural integrity of the monolithic structure of concrete;

a door aperture that is the only egress from the interior configured for people;

a sliding door that is laminated with a steel sheet sandwiched between a pair of plywood sheets; and a roller assembly supports the sliding door between a first position wherein the door aperture is open for egress to a second position wherein the door aperture is closed for egress.

13. The saferoom of claim 12, further comprising:

a footing that is integral to the monolithic structure of concrete, wherein the footing is dimensioned to a depth determined by a local frost line.

14. The saferoom of claim 12, wherein the ventilation ports are 6" and 24" above elevation of the floor slab.

15. The saferoom of claim 12, further comprising:

a ventilation cap covers each of the plurality of ventilation ports.

16. The saferoom of claim 12, wherein the sliding door is supported on four sides by the saferoom.

17. A saferoom comprising:

a flat ceiling;

a plurality of walls substantially vertical with respect to the flat ceiling, the plurality of walls substantially at right angles to each other;

a floor slab substantially horizontal with respect to the plurality of walls, wherein the flat ceiling, the plurality of walls, and the floor slab are a monolithic structure of concrete without seams and without joints between the flat ceiling, the plurality of walls, and the floor slab;

an interior of the monolithic structure of concrete;

a plurality of ventilation ports in each of the plurality of walls, wherein the ventilation ports are configured to provide ventilation of the interior during severe weather; and a PVC tube through each of the plurality of ventilation ports.

18. The saferoom of claim 17, further comprising:

a door aperture that is the only egress from an interior configured for people; and a sliding door configured to slide between a first position wherein the door aperture is open for egress to a second position wherein the door aperture is closed for egress.

* * * * *